United States Patent
Graves (10) Patent No.: US 8,214,802 B1
(45) Date of Patent: Jul. 3, 2012

(54) PROVIDING VISUAL PREVIEW OF INTERMEDIATE STEPS OF SOFTWARE CONFIGURATION

(75) Inventor: Mikol Graves, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1270 days.

(21) Appl. No.: 11/672,842

(22) Filed: Feb. 8, 2007

(51) Int. Cl.
*G06F 9/44* (2006.01)
*G06F 3/00* (2006.01)

(52) U.S. Cl. ........ 717/121; 717/109; 717/120; 715/733; 715/734; 715/735

(58) Field of Classification Search .......................... None
See application file for complete search history.

(56) References Cited

U.S. PATENT DOCUMENTS

| | | | |
|---|---|---|---|
| 6,567,977 B1 * | 5/2003 | Kumar ............................ | 717/174 |
| 6,601,233 B1 * | 7/2003 | Underwood ................... | 717/102 |
| 6,907,546 B1 * | 6/2005 | Haswell et al. ............ | 714/38.11 |
| 7,171,628 B1 * | 1/2007 | Perttunen ...................... | 715/853 |
| 7,269,722 B1 * | 9/2007 | Neary .............................. | 713/1 |
| 7,447,994 B2 * | 11/2008 | Mase et al. .................... | 715/735 |
| 7,761,811 B1 * | 7/2010 | Chaudhri ....................... | 715/835 |
| 7,802,246 B1 * | 9/2010 | Kennedy et al. .............. | 717/173 |
| 7,849,440 B1 * | 12/2010 | Englehart ...................... | 717/106 |
| 2002/0095663 A1 * | 7/2002 | Joory ............................. | 717/136 |
| 2005/0251784 A1 * | 11/2005 | Krebs ............................ | 717/104 |
| 2005/0257204 A1 * | 11/2005 | Bryant et al. ................. | 717/163 |
| 2006/0075382 A1 * | 4/2006 | Shaburov ...................... | 717/106 |
| 2006/0218528 A1 * | 9/2006 | Lerner et al. .................. | 717/120 |
| 2006/0259904 A1 * | 11/2006 | Celli et al. .................... | 717/174 |
| 2007/0101288 A1 * | 5/2007 | Forstall et al. ................ | 715/781 |
| 2008/0127095 A1 * | 5/2008 | Brennan et al. ............... | 717/124 |
| 2010/0313198 A1 * | 12/2010 | Chaudhri ...................... | 717/174 |

OTHER PUBLICATIONS

Stanek, William B., "Managing File Systems and Drives," 1999, [online] [retrieved Apr. 18, 2007] Retrieved from the Internet <URL:http://www.microsoft.com/technet/archive/winntas/maintain/featusability/manag.mspx>.

* cited by examiner

*Primary Examiner* — Isaac Tecklu (57) ABSTRACT

A step-by-step visual preview into a guided software configuration process is provided, where the preview is updated in real time as users specify the parameters of the software during the software configuration process, thereby providing a visual explanation of the various components of the software and their relationship to one another. Before the newly assembled software configuration is actually performed, the complete graphical representation of the software configuration is displayed for approval.

20 Claims, 8 Drawing Sheets

PROVIDING VISUAL PREVIEW OF INTERMEDIATE STEPS OF SOFTWARE CONFIGURATION

BACKGROUND OF THE INVENTION

1. Field of the Invention

The present invention relates to software configuration and, more specifically, to providing a visual preview of the intermediate steps of software configuration before the software configuration is actually performed.

2. Description of the Related Art

Software products, such as complex operating systems, are often comprised of many interdependent configurable subsystems, and the relationship between these subsystems or components is not always obvious to the untrained eye. Graphical user interfaces can enhance an end-user's understanding of complex software by modeling the system and its components visually. However, graphical user interfaces themselves can be complex to understand without accompanying documentation or prior experience. Explanatory text that explains the software configuration process, while it may be helpful, is often too brief to provide the necessary context and detail to facilitate an adequate understanding of the software configuration process for the users. Furthermore, such supplemental text is typically not presented in a manner integrated to the graphical user interface. As a result, users of complex software have to configure software without the background information necessary to evaluate the outcome of a variety of selections that they make during the software configuration process.

Conventional software configuration tools, if they include a graphical user interface at all, typically utilize a simple series of steps or a "wizard" to accept the user's selection of a variety of configuration options or parameters to configure the software. Each step of the wizard, even though it may depend upon preceding steps, is usually presented in isolation in order to simplify its appearance. The conventional software configuration wizards do not provide a step-by-step visual representation of the progress of the software configuration as various selections are made by the user in each step of the software configuration process. In fact, conventional software configuration wizards are often designed to hide many of the steps and complexity of the software configuration process to simplify presentation to the user. Thus, such conventional software configuration wizards cannot guide the user effectively by illustrating the consequences of the user's selection of a variety of options, step by step during the software configuration process.

In addition, although some conventional software configuration wizards, such as the disk management tool provided by Microsoft Corporation, include graphical representations of the software, they only show the initial state of the software prior to the software configuration and the final state of the software after the software configuration is complete. Conventional software configuration wizards do not show a preview of the software state that reflects the user's selections of the parameters modifying the initial state of the software before the software configuration is actually performed. Thus, there is no way for users to preview the consequences of their selection of the various parameters during the software configuration process without actually committing the software configuration.

Therefore, there is a need for a software configuration tool that provides a visual, step-by-step illustration of a software configuration process and how the software configuration changes in response to the selection of various software configuration options. There is also a need for a software configuration tool that shows previews of the software state reflecting the selection of the various software configuration options before the software configuration is actually performed.

SUMMARY OF THE INVENTION

The present invention provides a step-by-step visual preview into a guided software configuration process, where the preview is updated in real time as users specify the parameters of the software during the software configuration process, thereby providing a visual explanation of the various components of the software and their relationship to one another. Before the newly assembled software configuration is committed, the complete graphical representation of the software configuration is displayed for approval.

Embodiments of the present invention include a method, a computer program product, and a system for providing the step-by-step visual preview of the software configuration process. In one embodiment, a plurality of parameters for configuring the software are displayed, and a selection of one or more of the parameters is received to configure the software. One or more previews of the software are displayed before the software configuration is actually performed, where the preview is representative of an intermediate state of the software configuration modifying an initial state of the software configuration in response to the selection of said one or more of the parameters. In other words, the preview graphically represents the intermediate state of the software configuration that would result from the selected parameters if the software configuration is actually performed with the selected parameters. Each of the previews corresponds to a different step of the software configuration and to a different selected parameter for the software configuration. Then, the software configuration is actually performed based on the selected parameters.

The present invention has the advantage that the users are graphically guided throughout the software configuration process such that they easily understand the consequences of their selection of various software configuration parameters during the software configuration process before they make a final commitment completing the software configuration process. In addition, constant visual feedback illustrating the change in the software configuration in response to their selection of the various software configuration parameters helps the users familiarize themselves with the software system gradually as it is configured, resulting in a graphical representation of the software that can be useful during ongoing maintenance, monitoring and control of the software after the software configuration is performed.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
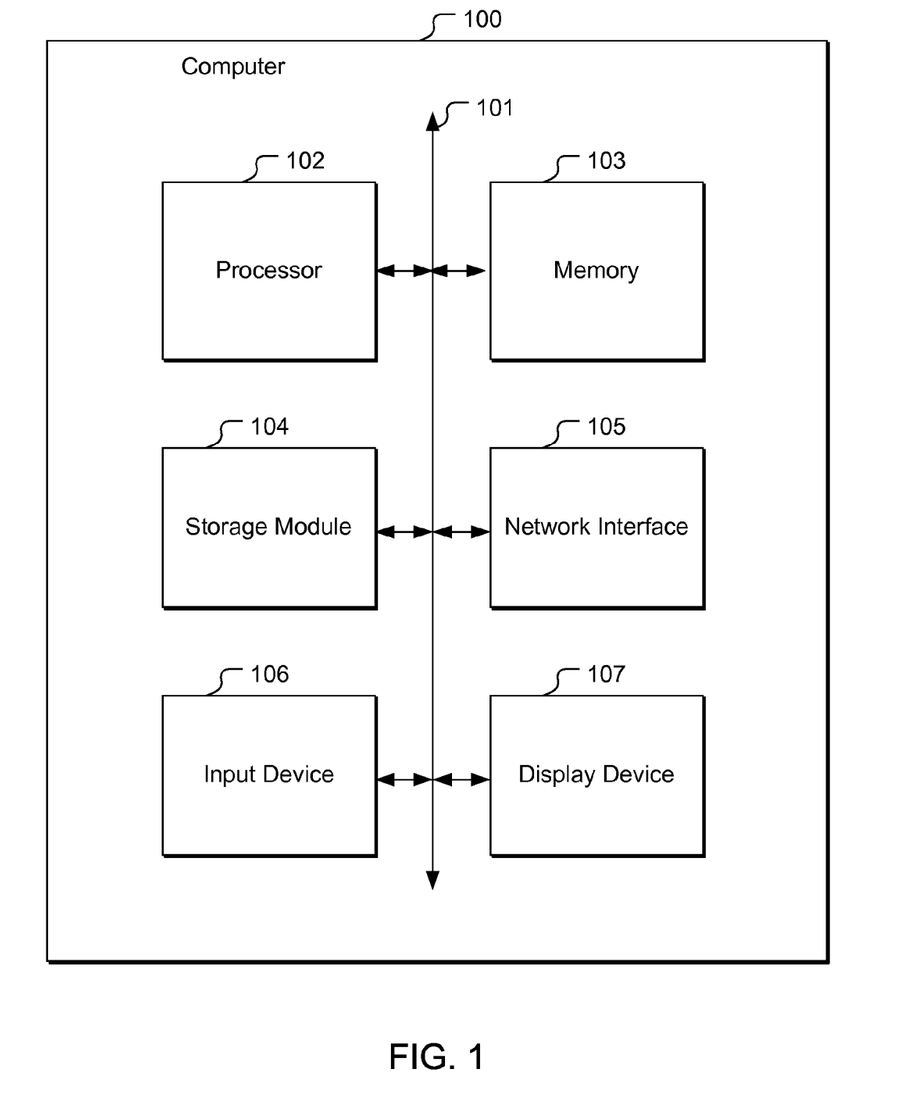
FIG. 1 illustrates a general purpose computer system upon which the method of providing a visual preview of intermediate steps of software configuration can be implemented, according to one embodiment of the present invention.

FIG. 1 illustrates a general purpose computer system upon which the method of providing a visual preview of intermediate steps of software configuration can be implemented, according to one embodiment of the present invention. The computer 100 can be one on which a software is to be installed, where the software itself also includes the functionalities of providing a step-by-step visual preview of intermediate steps of configuring the software itself. For example, the software may be computer virtualization software such as those offered by VMware, Inc. of Palo Alto, Calif., where the virtualization software is installed on the computer 100. Such software is capable of configuring a variety of software components and functionalities based on the user's selection of various parameters during the software configuration process. The example of configuring a virtual Ethernet switch will be used herein to illustrate the present invention, although the present invention may be used in any type of software configuration process. The computer 100 includes one or more processors 102, a memory 103, a storage module (e.g., hard disk drive) 104, an input device (e.g., keyboard, mouse, and the like) 106, a display device 107, and a network interface 105, exchanging data with one another through a bus 101.

The network interface 105 may include a NIC (network interface card) or other standard network interfaces to communicate with other network interface devices coupled to a network (not shown). The storage module 104 stores the software that is to be installed and configured in the computer 100, which software itself also includes the functionalities of providing the step-by-step visual preview of intermediate steps of configuring the software itself. Such software is loaded to the memory 103 and run by the processor 102. The display device 107 can be a standard liquid crystal display or any other type of display device, and displays the graphical representations of the various software configuration states, step-by-step, during the software configuration process. Note that not all components of the computer 100 are shown in FIG. 1 and that certain components not necessary for illustration of the present invention are omitted herein.

Figure 2:
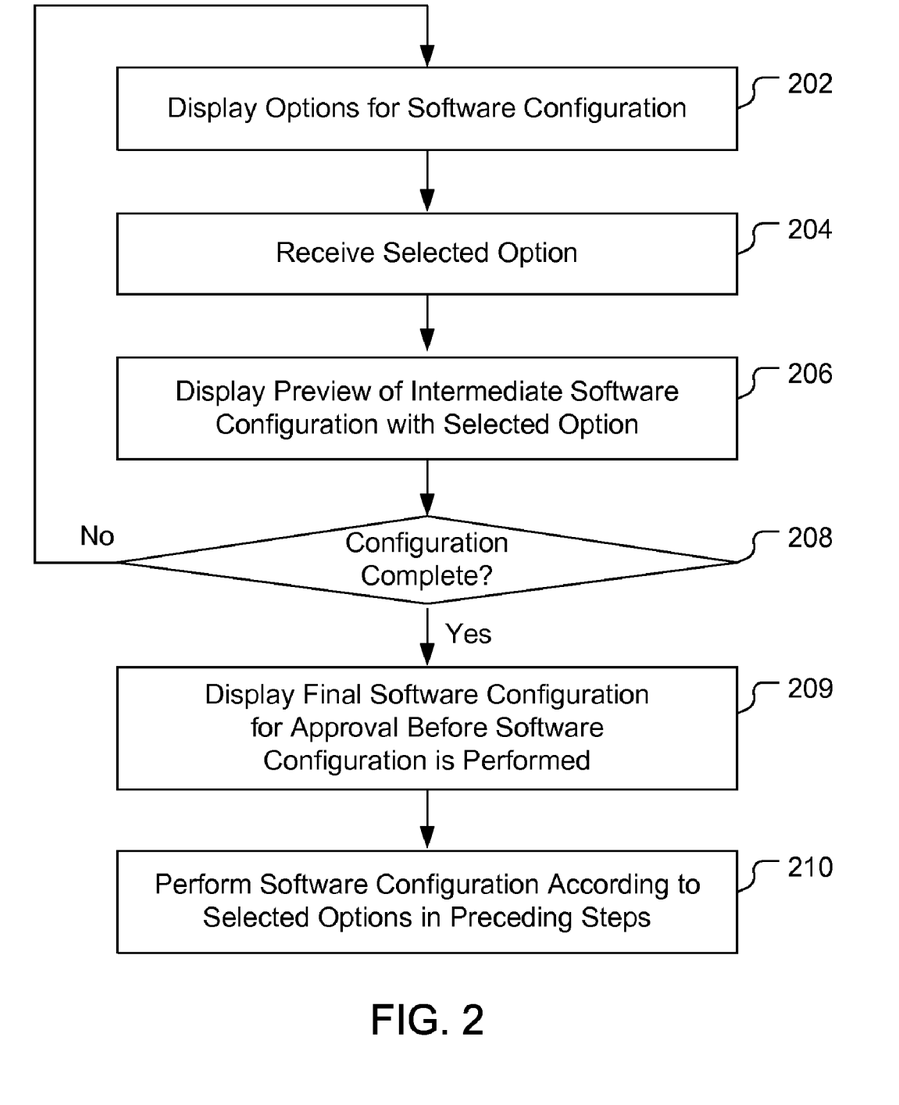
FIG. 2 is a flow diagram illustrating the method of providing one or more visual previews of intermediate steps of software configuration, according to one embodiment of the present invention.

FIG. 2 is a flow diagram illustrating the method of providing a visual preview of intermediate steps of software configuration according to one embodiment of the present invention, and FIGS. 3A-3F illustrate examples of user interfaces displayed on the computer 100 through which the visual preview of intermediate steps of software configuration are provided, according to one embodiment of the present invention. The examples shown in FIGS. 3A-3F are screenshots of the graphical user interface for configuring a virtual Ethernet switch. FIG. 2 will be explained together with FIGS. 3A-3F.

Figure 3A:
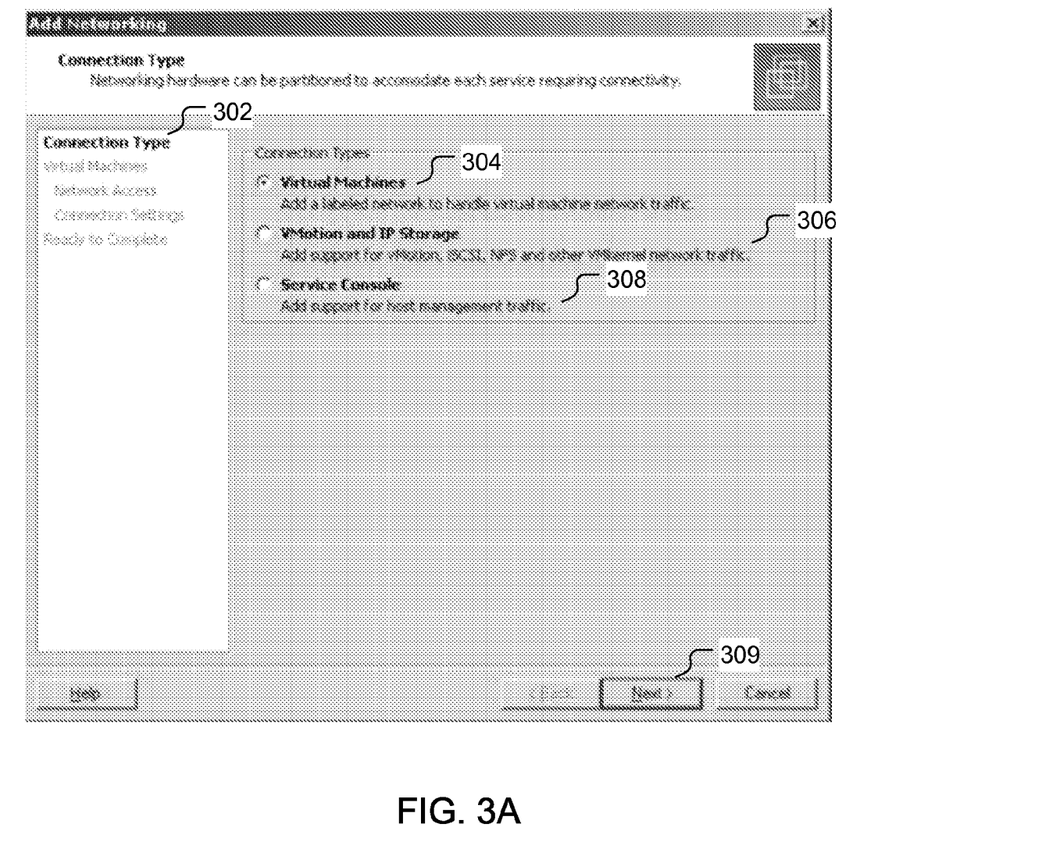
FIGS. 3A-3F illustrate examples of user interfaces through which the visual previews of intermediate steps of software configuration are provided, according to one embodiment of the present invention.

Referring to FIG. 2, as the software configuration process is started, a plurality of options (or parameters) for software configuration are displayed 202 on the display device 107 of the computer 100 for selection by the user. For example, referring to FIG. 3A, options are provided to the user to select the connection type 302 for the virtual Ethernet switch, i.e., Virtual Machines 304, VMotion and IP storage 306, and Service Console 308. The user's selection of one or more of the options is received 204 (FIG. 2). For example, as shown in FIG. 3A, Virtual Machines 304 was selected as the connection type 302. The user can proceed to the next step of the software configuration process by clicking the "Next" button 309.

Referring back to FIG. 2, a graphical preview of the intermediate configuration of the software with the selected option is displayed 206 to the user on the display device 107 of the computer 100 in real time as the option is selected. For example, referring to FIG. 3B, a preview 316 graphically represents the configuration state of the software that would result from the user's selection of Virtual Machines in FIG. 3A if the software configuration is actually executed. Specifically, in the example of FIG. 3B, "VM Network 1" 317 (VM for virtual machine) is shown selected in response to the selection of "Virtual Machines" 304 in FIG. 3A. In order to display the previews in real time, the software may include pre-stored graphical representations of all possible combinations of the software configurations corresponding to each step and each combination of parameters of the software configuration process, and display the one corresponding to the parameters selected in that software configuration step. Although FIG. 3A illustrates that the selection of the options or parameters is made by selecting an icon separate from the preview 316, in other embodiments, the selection of the parameters can be made by directly modifying or selecting the parameters in the preview 316 itself, either in addition to, or instead of, the method illustrated in FIG. 3A.

Then, it is determined 208 whether the software configuration is complete. If it is complete, then the final state of the software configuration is displayed 209 on the display device 107 of the computer 100 before the software configuration is actually performed. Then, the software configuration is actually performed 210 according to the parameters as selected by the user in the various steps of the software configuration process. If the software configuration is not complete in step 208, the process returns to step 202 for the next step of the software configuration.

Figure 3B:
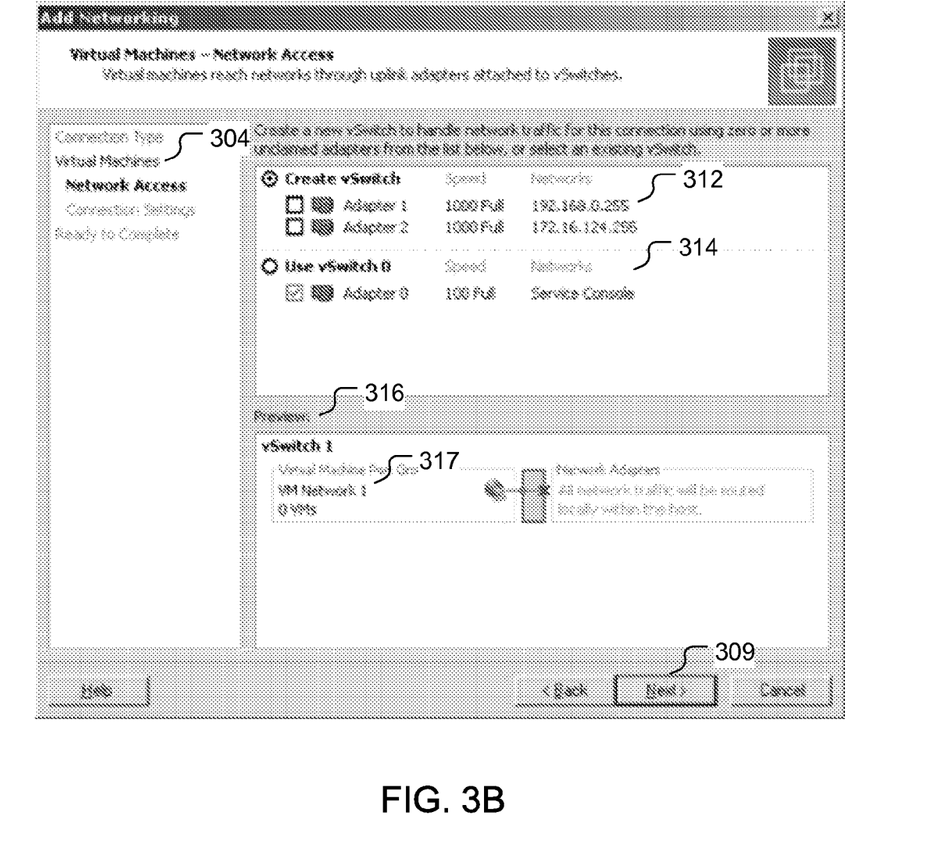
Figure 3C:
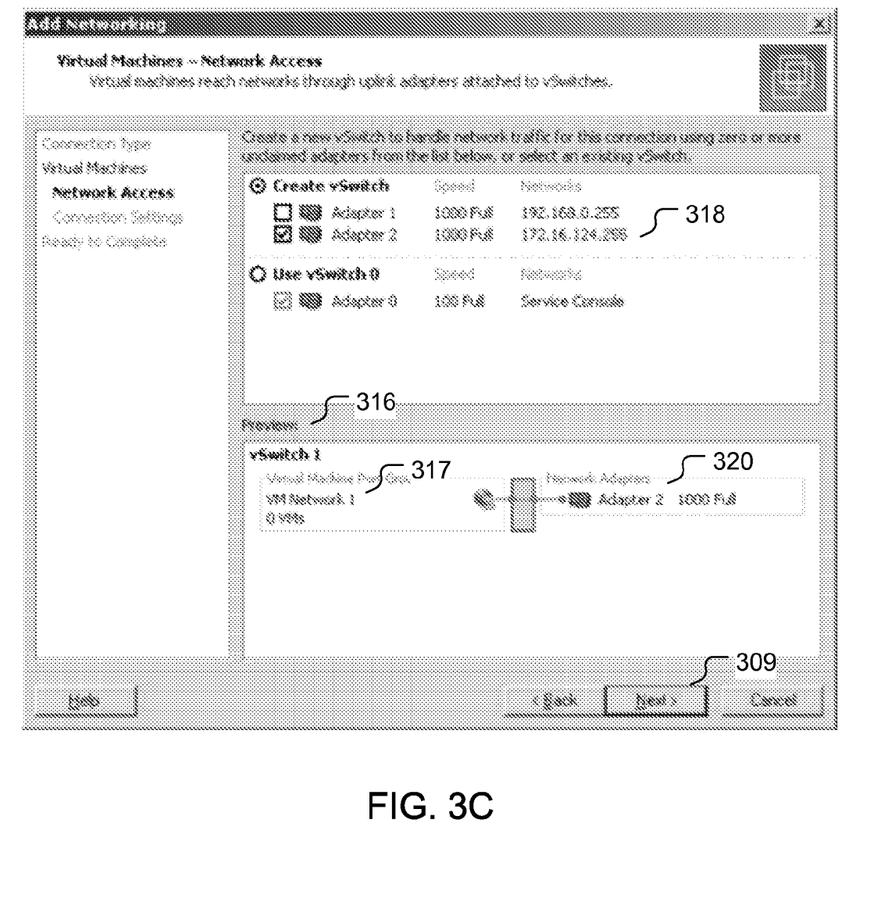

For example, in the example of FIG. 3B, the software configuration process is still not complete, so the process returns to step 202. This time, a selection of network access adaptors 312, 314 is requested in the display (step 202). In FIG. 3C, it is shown that Adaptor 2 318 is selected (step 204), and a preview 316 includes the Adaptor 2 320 shown as the selected network adaptor.

Figure 3D:
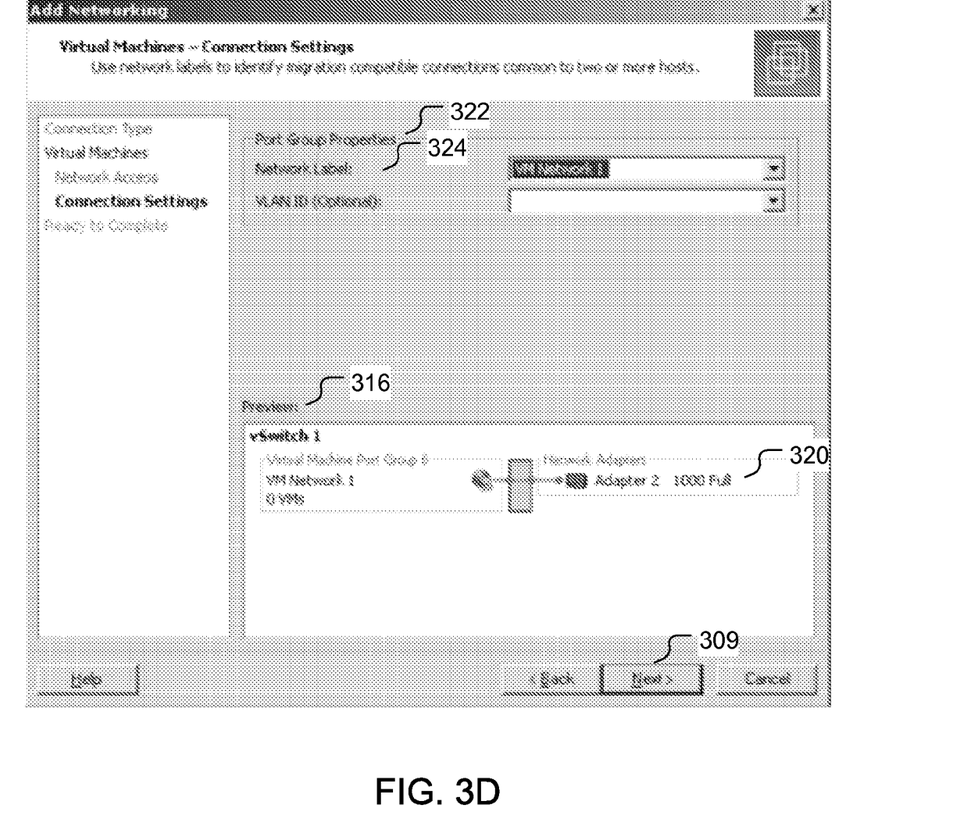
Figure 3E:
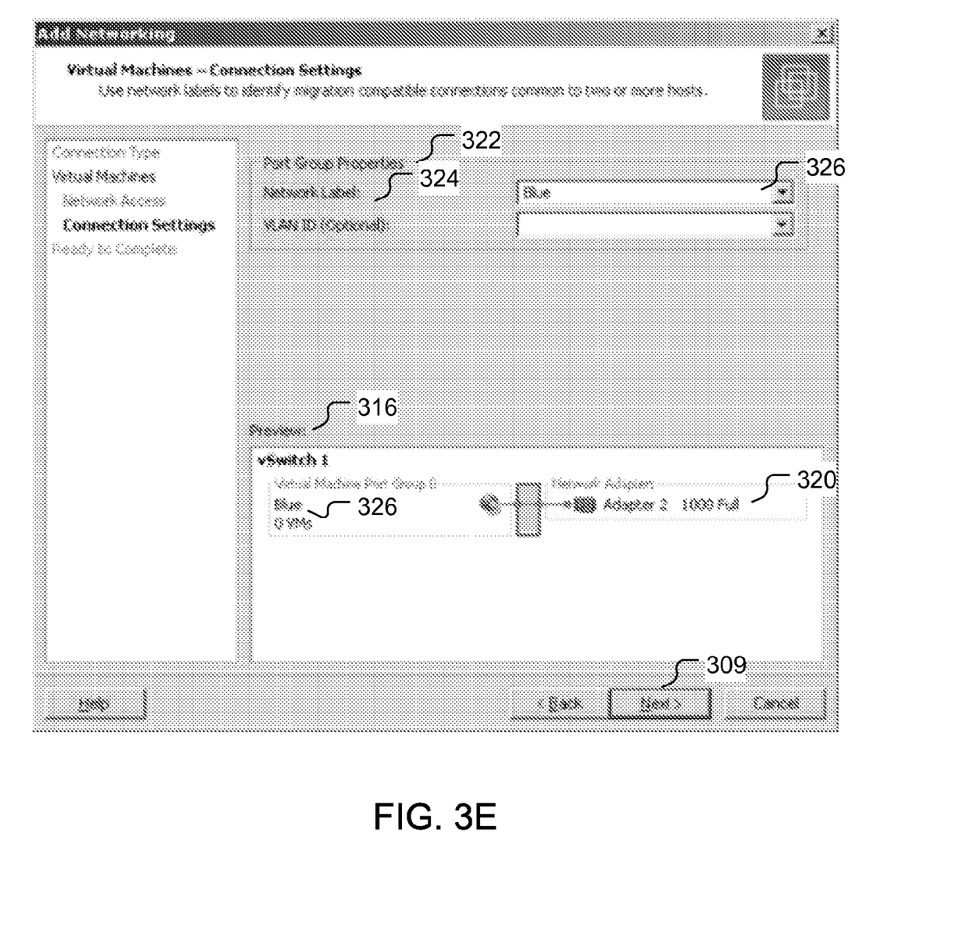

Referring to FIG. 3D, the software configuration is still not complete, this time requesting the user to define the Port Group Properties 322, specifically the Network Label 324 (step 202). Referring to FIG. 3E, as the user selects "Blue" 326 as the network label 324 (step 204), the preview 316 also reflects that the network label has changed to "Blue" 326 (step 206).

Figure 3F:
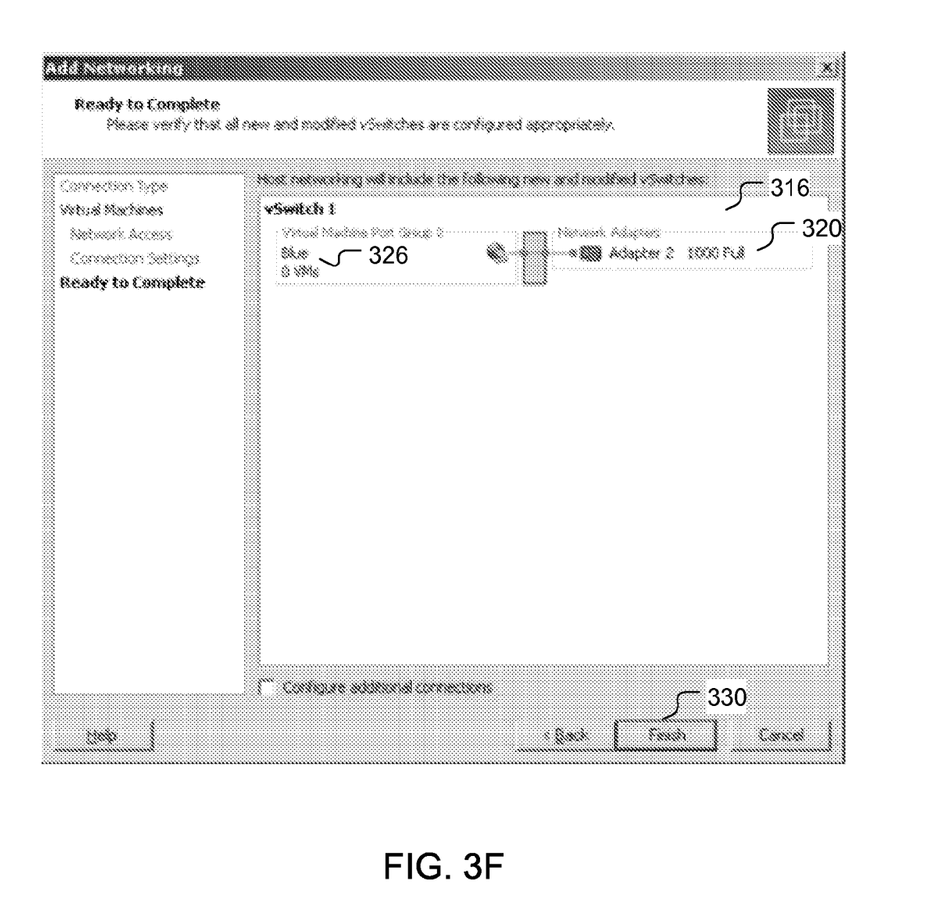

Referring to FIG. 3F, now that the software configuration is complete (i.e., all selections of the software configuration parameters have been made), the final software configuration that reflects all the previous steps of the software configuration is graphically displayed in the preview 316 before the user finally commits to this software configuration (step 209). The software will be configured (step 310) according to the parameters selected in the preceding steps as shown in FIG. 3F once the user clicks the "Finish" button 330.

The present invention has the advantage that the users are graphically guided throughout the software configuration process such that they easily understand the consequences of their selection of various software configuration parameters during the software configuration process before they make a final commitment completing the software configuration. In addition, constant visual feedback illustrating the change in the software configuration in response to their selection of various software configuration parameters helps the users familiarize themselves with the software system gradually as it is configured, resulting in a graphical representation of the software that can be useful during on-going maintenance, monitoring and control of the software after the software configuration.

Upon reading this disclosure, those of ordinary skill in the art will appreciate still additional alternative processes for providing a visual, step-by-step preview of the software configuration process. For example, although the present invention was described in the context of configuring a virtual Ethernet switch, the present invention can be applied to the configuration of any type of software running on any type of computer. The present invention can be used for configuring new software as well as modifying the configuration of software that has been previously configured. For another example, although visual previews 316 were provided to illustrate the various intermediate software configuration states, audible messages describing the intermediate configuration states can also be provided as the previews. Various graphical techniques such as zooming and panning operations may be used with the present invention in order to more effectively present the previews to the user.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method of configuring software on a computer, the method comprising:
displaying a plurality of first parameters for configuring the software during a step of a multi-step software configuration process, the first parameters being selectable to configure the software to a software configuration from a plurality of possible software configurations, the software configuration not including at least one of the first parameters not selected for configuring the software when the software configuration is executed;
receiving a selection of one or more of the first parameters;
displaying a preview of the software prior to the software configuration being executed, the preview being representative of an intermediate state of the software configuration modifying an initial state of the software configuration responsive to the selection of said one or more of the first parameters;
displaying a plurality of second parameters without the first parameters for configuring the software during another step of the multi-step software configuration process;
receiving a selection of one or more of the second parameters; and
displaying another preview of the software prior to the software configuration being executed, the another preview being a modified version of the preview in response to the selection of said one or more of the second parameters.

2. The method of claim 1, further comprising:
displaying the final state of the software configuration according to the selected parameters prior to performing the software configuration; and
performing the software configuration.

3. The method of claim 1, wherein the preview graphically represents the intermediate state of the software configuration that would result from the selected parameters, and wherein the preview provides a visual explanation of components of the software and a relationship between the components.

4. The method of claim 1, wherein the parameters are selected by making a modification to the displayed preview.

5. The method of claim 1, wherein the multi-step software configuration process is a guided step-by-step software configuration process.

6. The method of claim 1, wherein the preview is also accompanied by an audio message describing the intermediate state of the software configuration.

7. The method of claim 1, wherein the software includes computer virtualization software, and wherein the step and the another step of the multi-step software configuration process are steps for configuring a virtual network switch.

8. A computer program product stored on a computer readable medium and adapted to perform a computer-implemented method of configuring software on a computer, the method comprising:
displaying a plurality of first parameters for configuring the software during a step of a multi-step software configuration process, the first parameters being selectable to configure the software to a software configuration from a plurality of possible software configurations, the software configuration not including at least one of the first parameters not selected for configuring the software when the software configuration is executed;
receiving a selection of one or more of the first parameters;
displaying a preview of the software prior to the software configuration being executed, the preview being representative of an intermediate state of the software configuration modifying an initial state of the software configuration responsive to the selection of said one or more of the first parameters;
displaying a plurality of second parameters without the first parameters for configuring the software during another step of the multi-step software configuration process;
receiving a selection of one or more of the second parameters; and displaying another preview of the software prior to the software configuration being executed, the another preview being a modified version of the preview in response to the selection of said one or more of the second parameters.

9. The computer program product of claim 8, wherein the method further comprises:
   displaying the final state of the software configuration according to the selected parameters prior to performing the software configuration; and
   performing the software configuration.

10. The computer program product of claim 8, wherein the preview graphically represents the intermediate state of the software configuration that would result from the selected parameter, and wherein the preview provides a visual explanation of components of the software and a relationship between the components.

11. The computer program product of claim 8, wherein the parameter is selected by making a modification to the displayed preview.

12. The computer program product of claim 8, wherein the multi-step software configuration process is a guided step-by-step software configuration process.

13. The computer program product of claim 8, wherein the preview is also accompanied by an audio message describing the intermediate state of the software configuration.

14. The computer program product of claim 8, wherein the preview includes a graphical representation of the final state of the software configuration that would be obtained if the software configuration is actually performed.

15. A computer system including a memory storing computer instructions adapted to perform a computer-implemented method of configuring software on the computer system and a processor for executing the computer instructions, the method comprising:
   displaying a plurality of first parameters for configuring the software during a step of a multi-step software configuration process, the first parameters being selectable to configure the software to a software configuration from a plurality of possible software configurations, the software configuration not including at least one of the first parameters not selected for configuring the software when the software configuration is executed;
   receiving a selection of one or more of the first parameters;
   displaying a preview of the software prior to the software configuration being executed, the preview being representative of an intermediate state of the software configuration modifying an initial state of the software configuration responsive to the selection of said one or more of the first parameters;
   displaying a plurality of second parameters without the first parameters for configuring the software during another step of the multi-step software configuration process;
   receiving a selection of one or more of the second parameters; and
   displaying another preview of the software prior to the software configuration being executed, the another preview being a modified version of the preview in response to the selection of said one or more of the second parameters.

16. The computer system of claim 15, wherein the method further comprises:
   displaying the final state of the software configuration according to the selected parameters prior to performing the software configuration; and
   performing the software configuration.

17. The computer system of claim 15, wherein the preview graphically represents the intermediate state of the software configuration that would result from the selected parameter, and wherein the preview provides a visual explanation of components of the software and a relationship between the components.

18. The computer system of claim 15, wherein the parameter is selected by making a modification to the displayed preview.

19. The computer system of claim 15, wherein the multi-step software configuration process is a guided step-by-step software configuration process.

20. The computer system of claim 15, wherein the software includes computer virtualization software, and wherein the step and the another step of the multi-step software configuration process are steps for configuring a virtual network switch.

* * * * *